(12) United States Patent
Dräger et al.

(10) Patent No.: US 6,935,478 B2
(45) Date of Patent: Aug. 30, 2005

(54) FLUID FRICTION CLUTCH (75) Inventors: Jochen Dräger, Freiburg (DE); Gerold Schultheiss, Pforzheim (DE); Rudolf Stoklossa, Mühlacker (DE)

(73) Assignee: BEHR GmbH & Co., Stuggart (DE)

( * ) Notice: Subject to any disclaimer, the term of this patent is extended or adjusted under 35 U.S.C. 154(b) by 0 days.

(21) Appl. No.: 10/647,110

(22) Filed: Aug. 25, 2003

(65) Prior Publication Data

US 2004/0168877 A1 Sep. 2, 2004

(30) Foreign Application Priority Data

Aug. 23, 2002 (DE) .......................................... 102 38 739

(51) Int. Cl.[7] .............................................. F16D 35/02
(52) U.S. Cl. ................... 192/58.61; 192/58.7; 192/58.8
(58) Field of Search ............................. 192/58.61, 58.7, 192/58.8

(56) References Cited

U.S. PATENT DOCUMENTS

| | | | | | |
|---|---|---|---|---|---|
| 2,792,095 | A | * | 5/1957 | Sherman | .................... 192/58.6 |
| 3,893,555 | A | | 7/1975 | Elmer | |
| 4,004,668 | A | * | 1/1977 | Blair | ......................... 192/58.7 |
| 4,046,239 | A | | 9/1977 | Tinholt | |
| 4,305,491 | A | | 12/1981 | Rohrer | |
| 4,355,709 | A | | 10/1982 | Light | |
| 4,441,599 | A | * | 4/1984 | Storz | ......................... 192/58.7 |
| 4,564,094 | A | | 1/1986 | Storz | |
| 4,667,791 | A | | 5/1987 | Martin et al. | |
| 4,850,465 | A | | 7/1989 | Ono | |
| 4,903,805 | A | * | 2/1990 | Ono | ....................... 192/58.681 |
| 5,803,221 | A | * | 9/1998 | Kawada et al. | ............ 192/58.7 |
| 5,893,442 | A | | 4/1999 | Light | |
| 5,992,594 | A | * | 11/1999 | Herrle et al. | ............ 192/58.61 |
| 6,032,775 | A | | 3/2000 | Martin | |
| 2001/0027903 | A1 | * | 10/2001 | Lutz | ......................... 192/12 D |

FOREIGN PATENT DOCUMENTS

| | | | |
|---|---|---|---|
| DE | 2 414 017 | | 12/1974 |
| DE | 31 09 724 A1 | | 2/1982 |
| DE | 34 45 664 C2 | | 12/1987 |
| DE | 31 47 797 C2 | | 2/1988 |
| DE | 37 39 564 A1 | | 6/1988 |
| DE | 197 41 073 A1 | | 3/1999 |
| DE | 197 42 823 A1 | | 4/1999 |
| DE | 198 10 296 A1 | | 9/1999 |
| GB | 2 144 833 A | | 3/1985 |
| JP | 2001254760 A | * | 9/2001 .......... F16D/35/02 |
| WO | WO01/14759 A1 | | 3/2001 |

* cited by examiner

Primary Examiner—Richard M. Lorence
(74) Attorney, Agent, or Firm—Foley & Lardner LLP (57) ABSTRACT

A fluid friction clutch, in particular for a motor vehicle fan, having a rotatably mounted shaft wherein a reservoir for at least largely holding the fluid is provided radially inside an outer periphery of the drive body, and wherein at least one first flow path and at least one second flow path are provided, which are used to connect the reservoir to the coupling area, and wherein the drive body, at the outer periphery, has at least one flow resistance element which is arranged between the at least first flow path and the at least second flow path, and wherein furthermore there is a controllable device for closing and opening at least one of these flow paths.

26 Claims, 9 Drawing Sheets

FLUID FRICTION CLUTCH

CROSS-REFERENCE TO RELATED PATENT APPLICATIONS

Federal Republic of Germany Priority Application 102 38 739.7, filed Aug. 23, 2002 including the specification, drawings, claims and abstract, is incorporated herein by reference in its entirety.

BACKGROUND OF THE INVENTION

The invention relates to a fluid friction clutch, in particular for use in a motor vehicle and in particular having a rotatably mounted shaft, a drive body mounted in a rotationally fixed manner on the shaft, an output body mounted rotatably on the shaft and at least partially surrounding the drive body, and a clutch region arranged between the drive body and output body which accommodates a viscous fluid and can be used to couple drive body and output body in order to transmit a torque.

Conventional fluid friction clutches of this type have a reservoir for a hydraulic fluid and a clutch region. In the clutch region, the forces are transmitted with the aid of hydraulic fluid which, when the clutch is actuated, is conveyed into the clutch region from the reservoir as a result of centrifugal forces. To be deactivated, the fluid is pumped back from the clutch region into the reservoir. This is effected, for example, by means of a ram pump which generates a ram pressure between the drive body and output body.

SUMMARY OF THE INVENTION

It is one object of the invention to provide an improved fluid friction clutch. It is a further object of the invention to provide a vehicle embodying the improved fluid friction clutch.

In accordance with one aspect of the present invention, there has been provided a fluid friction clutch, comprising: a rotatably mounted shaft; a drive body which is mounted in a rotationally fixed manner on the shaft; an output body, mounted rotatably on the shaft and at least partially surrounding the drive body; a clutch region arranged between the drive body and output body, which accommodates a viscous fluid and can be used to couple drive body and output body in order to transmit a torque; a reservoir for at least largely holding the fluid positioned radially inside an outer periphery of the drive body; at least one first flow path and at least one second flow path for connecting the reservoir to the coupling area; at least one flow resistance element located at the outer periphery of the drive body and arranged between the first flow path and the second flow path, and a controllable device for selectively closing and opening at least one of these flow paths.

In accordance with another aspect of the invention, there is provided a motor vehicle including a motor and a cooling fan driven by the motor, and a fluid friction clutch for connecting the motor and cooling fan, wherein the fluid friction clutch is as defined above.

Further objects, features and advantages of the present invention will become apparent from the detailed description of preferred embodiments that follows, when considered together with the accompanying figures of drawing.

BRIEF DESCRIPTION OF THE DRAWINGS

In the drawings:

FIG. 3a is another cross-sectional view through the drive body shown in FIG. 2a.

FIG. 6b is a detailed perspective view of the alternative embodiment of the device for closing and opening the flow paths from FIG. 6a.

FIG. 6c is a partial cross-sectional view of an alternative embodiment of the device for closing and opening the flow paths of a drive body, along section on line C—C in FIG. 6a.

DETAILED DESCRIPTION OF THE PREFERRED EMBODIMENTS

According to the preferred aspects of the invention, in the decoupled state of drive body and output body, a reservoir in the drive body substantially holds the hydraulic fluid, and when the clutch is activated the hydraulic fluid passes from the reservoir into the clutch region. The gap between drive body and output body in the clutch region is at least partially filled by the hydraulic fluid, so that a torque is transmitted.

The connection between reservoir and clutch region is effected separately for the incoming flow and return flow via, in each case, at least one flow path. At least one of these flow paths can be opened and closed by a control device.

Furthermore, according to other preferred aspects of the invention, the drive body, at the outer periphery, has at least one flow resistance element. Depending on the desired return delivery capacity, it is also possible for a plurality of flow resistance elements to be provided over the periphery. The shape of the resistance elements may differ in order to influence certain properties, such as return delivery quantity, leakage behavior, and/or pressure drop behind the flow resistance element, as seen in the direction of flow. A preferred shape is, for example, that of a cuboid.

A device according to one or more of the preferred embodiments has the following advantages and/or features:

In a preferred embodiment, the invention has a shaft which is mounted in a rotatably fixed position on the drive body and has at least two components.

A first component is connected in a non-positively locking manner to a drive unit and introduces a torque from the engine side into the clutch. The drive unit is, for example, the crankshaft of the engine.

A second component is held coaxially in the first component and is mounted rotatably with respect to the latter.

According to a preferred embodiment, the first component is a drive shaft for the drive body, and the second component is a control shaft for the control device for opening and closing the flow paths.

In a further preferred embodiment of the invention, the drive body, which is connected in a non-positively locking manner to the drive shaft, has concentric projections in the clutch region in order to increase the active surface area in the clutch region. On account of the different rotational speeds of the drive body and output body, shear forces are generated in the hydraulic fluid. The torque which can be transmitted is proportional to the shear force and to the surface area. Therefore, higher torques can be transmitted by increasing the surface area.

The projections are arranged in particular on the outer surfaces of the drive body. They project, for example, in the axial direction out of the side faces of the drive body and in one possible embodiment are of rectangular configuration in cross section.

According to a particularly preferred embodiment, however, the projections may also be trapezoidal, triangular or designed with a circular ending.

According to a further preferred embodiment, the output body of the invention also has concentric projections, in order likewise to increase the active surface area. These projections lie inside the output body and engage in the recesses in the output body with a predetermined distance.

In a particularly preferred embodiment of the invention, the hydraulic fluid consists of a viscous fluid which includes at least one fluid from the group of fluids consisting of hydraulic oil, silicone oil, silicone, a synthetic or natural polymer compound and a hydrocarbon compound.

The fluid fills or closes the shear gap in the clutch region between drive body and output body and, on account of the shear forces which are acting in the fluid, transmits the torque from the drive body to the output body. The viscosity of the fluid can be used, for example, to influence the shear forces or the time required to fill the clutch region. A low viscosity allows rapid filling but leads to low shear forces and therefore to a low torque transmission.

The invention preferably transmits a torque of from 10 Nm to 1000 Nm, preferably between 25 Nm and 500 Nm and particularly preferably between 50 Nm and 250 Nm between drive body and output body.

In a particularly preferred embodiment of the invention, the reservoir for the hydraulic fluid extends within the outer wall of the drive body and substantially over a radius section which is predetermined by the clutch region. The reservoir is, for example, configured in such a way that the hydraulic fluid, when the clutch is not actuated, is predominantly held in the radius section, which is predetermined by the clutch region.

The flow paths are preferably arranged radially in the periphery of the drive body and at a predetermined distance with respect to the flow resistance element. It is particularly preferable for the distance with respect to the flow resistance element to be so short that the flow paths directly adjoin the outer contour of the flow resistance element. The distance can be used, inter alia, to influence the delivery capacity and the speed at which the hydraulic fluid flows out of the reservoir into the clutch region. The shorter the distance, the higher the delivery capacity or the flow rate.

According to preferred refinement of the invention, at least one flow path for the return flow of the hydraulic fluid out of the clutch area into the reservoir is arranged in front of the flow resistance element, as seen in the direction of rotation, and at least one flow path for the incoming flow of the hydraulic fluid out of the reservoir into the clutch region is arranged behind the flow resistance element, as seen in the direction of rotation. The flow paths are arranged in particular in the outer wall of the periphery of the drive body and connect the reservoir to the clutch region on a predetermined route. They are, for example, designed as bores with a diameter of between 1 mm and 10 mm, preferably between 2 mm and 8 mm, and particularly preferably between 3 mm and 6 mm.

In a further advantageous configuration of the invention, the output body on the inner side of the periphery has a concentric recess which runs all the way around in the peripheral direction. The recess is in particular matched to the shape of the flow resistance element, in order to fix the ram pressure and the delivery capacity of the ram pump.

It is particularly preferable for the outer boundary of the flow resistance element to engage over a predetermined distance into the recess in the output body, which runs all the way around in the peripheral direction.

In a further embodiment of the invention, the flow resistance element engages in a substantially liquid-tight manner in the recess which runs all the way around in the peripheral direction. This causes the ram action of the flow resistance element to reach a maximum value.

In a further advantageous configuration of the invention, the projections of the drive body and/or of the output body are at least partially interrupted by at least one substantially radially arranged groove and are thereby connected in terms of flow dynamics.

According to a preferred embodiment of the invention, the contact surface area in the clutch region is altered as a function of the quantity of hydraulic fluid in the clutch region. The clutch region fills up, starting at the outer periphery, for example, on account of the centrifugal forces. The contact surface area is proportional to the quantity of hydraulic fluid in the clutch region.

According to a further preferred embodiment of the invention, the groove is arranged at a predetermined distance or angle with respect to the flow path. The angle is defined by two straight lines which intersect one another, the first straight line being an extension of the center axis of the groove through the center point of the drive body. The second straight line is an extension of the center axis of the flow path through the center point of the drive body. The angle or distance is used to control both the rate at which the profiles are filled with hydraulic fluid and the return of the hydraulic fluid.

A further advantageous embodiment of the invention includes a controllable device for closing and opening the flow paths. In a first position, the device opens the flow path for the incoming flow of the hydraulic fluid into the clutch region and closes the return flow. In a second position, the device closes the incoming flow and opens the return flow. The quantity of hydraulic fluid in the clutch region is determined by the filling or discharge, and the clutch is actuated or deactivated.

In a preferred embodiment of the invention, the control device for closing and opening the flow paths has a sealing element and a counterweight, which are arranged in a non-positively locking manner on the control shaft, and a restoring device. The restoring device is, for example, secured to the drive body and moves the control shaft, as soon as there is no longer any torque applied to it, into a limit position that is opposite to the limit position when a torque is present.

The sealing element is, for example, at a predetermined distance of from 0.1–1.0 mm, preferably 0.15–0.7 mm and particularly preferably 0.2–0.4 mm, from the inner contour of the drive body.

In a particularly preferred embodiment of the invention, the control device for closing and opening has two sealing elements which are connected to the control shaft via an articulated joint and radially close off the flow paths. Furthermore, according to this embodiment of the present invention, the sealing elements have two devices for compensating for the centrifugal forces.

In another preferred embodiment of the invention, the controllable device for closing and opening has two sealing elements for closing off the flow paths, which elements are connected to the drive body via a lever. The lever is in this case particularly preferably designed as a restoring element, for example, in the form of a leaf spring.

The sealing elements are, for example, at a predetermined distance of 0.1–1.0 mm, preferably 0.15–0.7 mm and particularly preferably 0.2–0.4 mm, from the inner contour of the drive body.

In a preferred embodiment of the invention, at least one of the flow paths, and preferably all the flow paths, can be closed off semi-radially by a sealing element. The direction of closure may, for example, be inclined by up to about 10° axially or tangentially with respect to a radial direction.

In the context of the present invention, the term "semi-radial" is understood as meaning a direction which is inclined with respect to a radial direction, i.e., a direction pointing away from an axis of rotation. The axis of inclination may in this case be arranged parallel to the axis of rotation (semi-radial and semi-tangential closure) or transversely with respect to the axis of rotation (semi-radial and semi-axial closure). The angle of inclination may in principle adopt any value between 0° and 90°.

The advantages of semi-radial closure reside in the fact that there is no longer any need to maintain a predetermined distance between the sealing element and an opening of the flow path. This improves the sealing action of the sealing element.

In a preferred embodiment of the invention, the position of the control shaft relative to the outer drive shaft is adjusted by means of an electromagnetically controlled torque device. The control shaft is, for example, moved between two limit positions, so that the device for closing and opening the flow paths is actuated. One limit position opens up the incoming flow into the clutch region, and the other limit position opens up the return flow out of the clutch region.

In a particularly preferred embodiment of the invention, the torque device is comprised essentially of a magnet armature, which is connected in a non-positively locking manner to the control shaft, a flux guide ring which is connected in a non-positively locking manner to the drive shaft, and a coil which is arranged in a rotationally fixed position in the housing. When the coil is energized, a current-dependent torque is formed between the magnet armature and the flux guide ring, and the control shaft is rotated relative to the drive shaft.

In one preferred embodiment of the invention, a bearing device for bearing the output body on the shaft and an electromagnetic control unit for controlling a controllable device for closing and opening one or more flow paths are arranged on opposite sides of the drive body. This allows an electromagnetic control device to be arranged adjacent to a controllable device for closing and opening, which is associated with simplified transmission of magnetic force and, under certain circumstances, provides a compact structure.

One possible area of use for the invention is in the automotive sector. The internal combustion engines used in that sector have in recent years undergone a huge increase in power. The increase in power leads to increased levels of heat being released from the engines. In addition to this heat source, the cooled exhaust gas recirculation is also responsible for increased introduction of heat into the cooling water. The latter is cooled again by a cooling system with the aid of a fan. The fan is connected to the engine via a fluid friction clutch. The fan can be switched on as required.

The clutch is controlled as a function of regulating variables. These include, for example, the cooling water temperature or the engine temperature.

According to the present invention, the term "control" is understood as meaning the operation in a system in which one or more variables as input variables influence other variables as output variables, on account of the basic laws inherent to the system.

The term "regulate" is understood as meaning an operation in which a variable, the variable to be regulated (regulating variable) is continually recorded, compared with another variable, (the reference variable), and is influenced as a function of the result of this comparison, with a view to matching it to the reference variable.

The text which follows explains further advantages and possible applications of the present invention on the basis of various exemplary embodiments. However, these are shown purely by way of example and are not to be understood as restricting the invention in any way.

Figure 1:
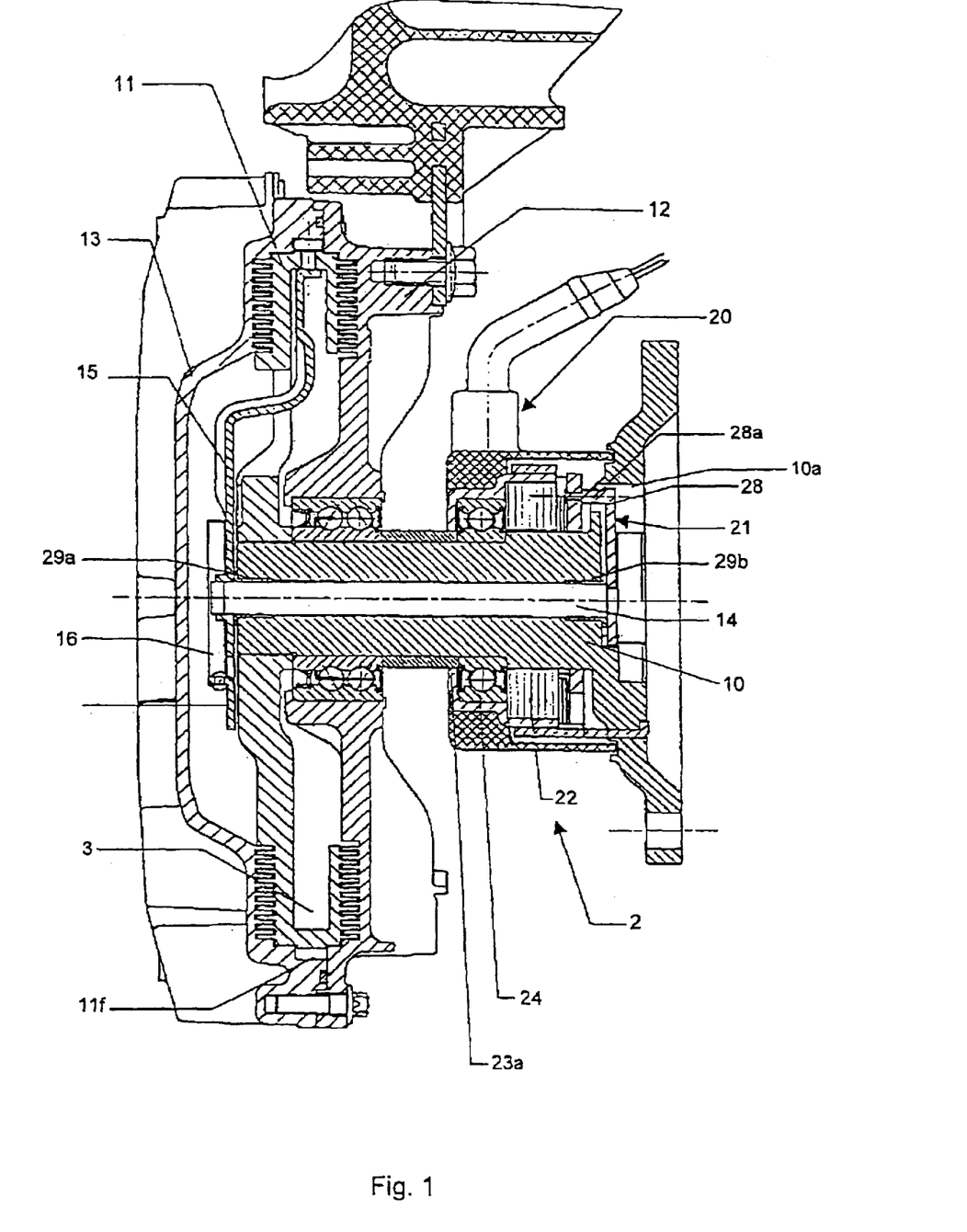
FIG. 1 is a cross-sectional view through a first exemplary embodiment of a fluid friction clutch according to the present invention.

FIG. 1 shows an embodiment of the invention in the form of a cross-sectional illustration. The fluid friction clutch comprises a drive shaft 10, a drive body 11 and an output body (comprising a base body 12 and a cover 13). The cover 13 has a recess 11f which runs all the way around in the peripheral direction. The reservoir 3 for the viscous fluid is located inside the drive body. The electromagnetically controlled torque and control device 2 comprises a rotationally fixed coil part 20, which is fixed to the drive shaft 10 by means of a rolling-contact bearing 24, and the adjustment elements 21 which rotate with the drive shaft 10. The adjustment movement is transmitted to the control device for opening and closing the flow paths (rotary slide) 15 via the control shaft (adjustment shaft) 14. When the magnet coil 22 is energized, the control shaft 14 moves into a first position (limit position), and when the magnet coil 22 is deenergized a restoring device (return spring) 16 moves the control shaft 14 into the opposite second position (limit position).

According to a preferred embodiment, the electromagnetically controlled torque device 2 operates in accordance with the pulse width modulation principle. Within a fixed cycle time, typically between 0.5 s and 5 s, the relative energizing time can be varied between 0% and 100%, in order thereby to vary the residence time in the two positions.

Alternatively, the electromagnetically controlled torque device can also be operated proportionally. The control shaft then moves continuously from one limit stop to the other as the energization of the coil increases. This operating mode requires that the magnetic force profile and the return spring be designed, so that stable working points are formed between the limit stops.

Figure 2A:
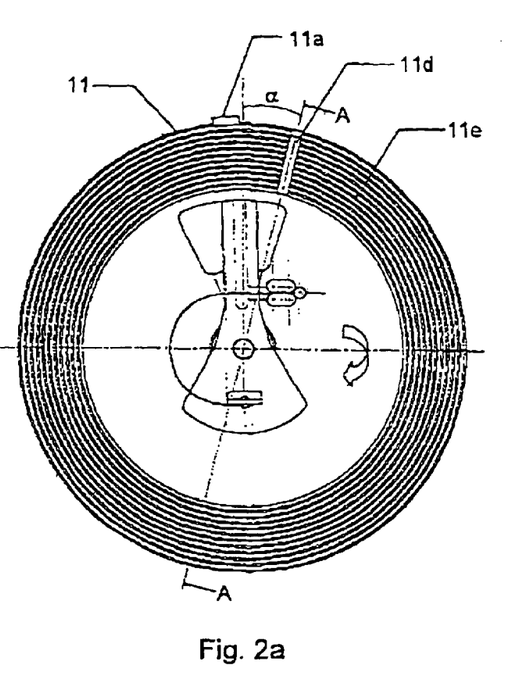
FIG. 2a is a plan view of a drive body of a fluid friction clutch as shown in FIG. 1.
Figure 2B:
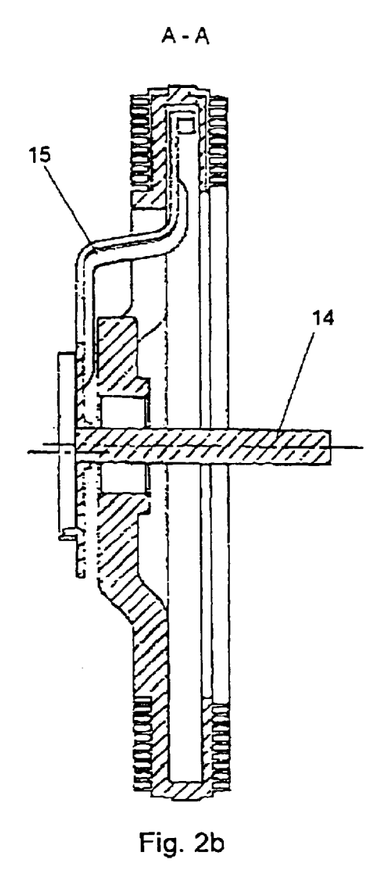
FIG. 2b is a cross-sectional view through the drive body of a fluid friction clutch shown in FIG. 2a, along line A—A.

FIGS. 2a/b show the drive body 11 of a fluid friction clutch. A flow resistance element 11a is arranged at the periphery of the drive body 11. This flow resistance element is the ram body of the ram pump. A radially running groove 11d is arranged in front of the flow resistance element, as seen in the direction of rotation, at an angular spacing of, for example, 10°–30° (angle α) with respect to the flow path for the return flow out of the clutch region into the reservoir at the outer surface. The groove 11d interrupts the projections 11e of the drive body.

Further alternative embodiments have two or more radially running grooves which are arranged on both sides of the drive body 11 and/or at the inner side of the output body (12, 13).

When the clutch is working, the rotational speed of the drive body 11 is greater than that of the output body (comprising a base body 12 and a cover 13) (FIG. 1), so that hydraulic fluid builds up in front of the flow resistance element 11a. The pressure prevailing there presses the hydraulic fluid into the reservoir 3 when the return bore 11b is open (FIG. 3b). When the return bore 11b is closed, the hydraulic fluid moves out to the radial grooves 11d on account of the pressure and fills the clutch region with the projections 11e from the outside inward. The angular position of the radial grooves 11d is decisive on the one hand for the speed at which the projections 11e are filled with hydraulic fluid and, on the other hand, for the completeness of the return flow into the reservoir when the return bore 11b is open. An incomplete return flow causes an excessive residual quantity of hydraulic fluid in the clutch region and therefore an undesirable residual torque in the clutch.

Figure 3A:
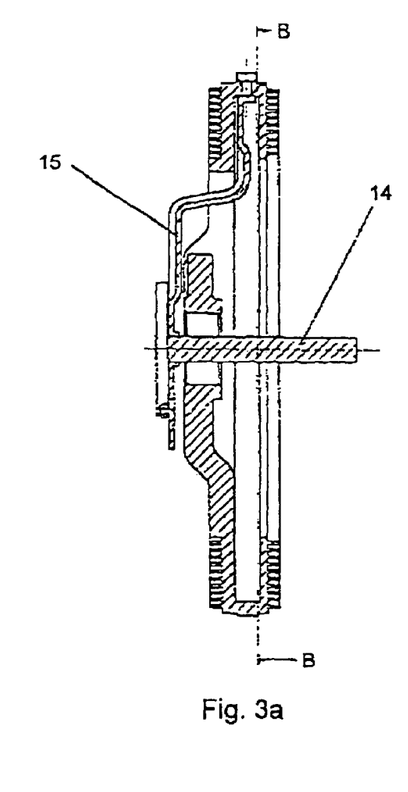
Figure 3B:
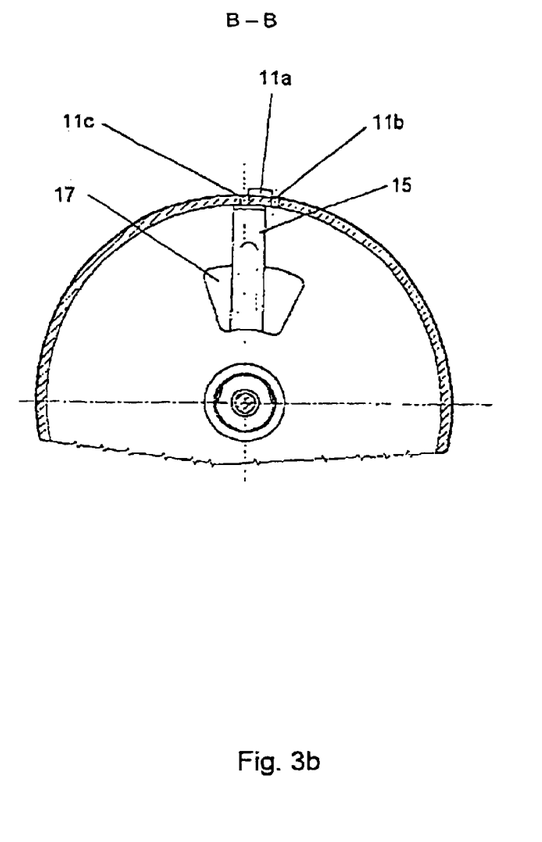
FIG. 3b is a cross-sectional view through the drive body shown in FIG. 3a along line B—B.

FIGS. 3a/b show another section through the drive body 11. A flow path for the return flow out of the clutch region into the reservoir (return bore) 11b is arranged in front of the flow resistance element 11a, as seen in the direction of flow, and a flow path for the incoming flow (feed bore) 11c of the hydraulic fluid is arranged behind the flow resistance element 11a, as seen in the direction of rotation.

The device for closing and opening the flow paths (rotary slide) 15 runs through an opening 17 in the drive body 11 and alternately closes off in each case one of the two flow paths 11b, 11c from the inside. The slide element 15 is non-positively connected to the control shaft 14 and is not in contact with the inner contour of the drive body 11. To ensure that the shear forces between slide element 15 and drive body 11, which inhibit the adjusting movement, do not become excessive, a predetermined gap is provided between slide element 15 and drive body 11. This requires relatively careful mounting of the control shaft 14. By way of example, according to a preferred embodiment, the control shaft 14 is mounted in the drive shaft 10 using two bearing bushes 29a, 29b (FIG. 1).

Figure 4:
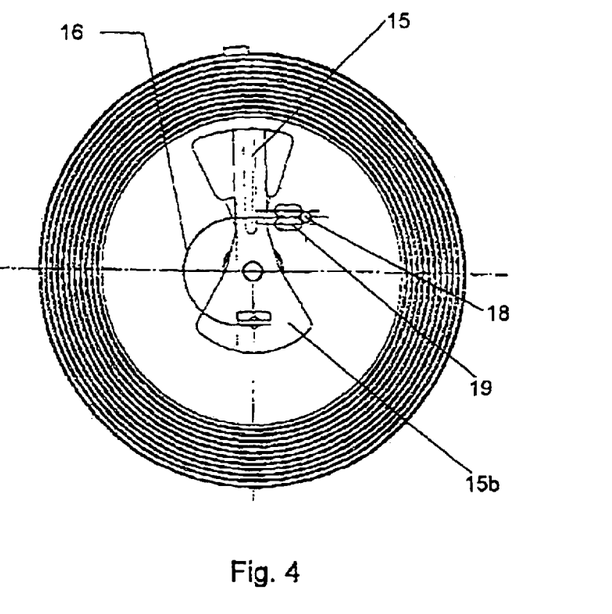
FIG. 4 is a plan view of a drive body and a device for closing and opening the flow paths.

FIG. 4 shows a device for closing and opening the flow paths 15. The restoring device (return spring) 16 has, at one end, a thickened portion 18 and is mounted in a plug connection device 19 on the drive body. At its other end, it is secured to the control device for opening and closing the flow paths (rotary slide) 15. As soon as no torque or only a very low torque is acting on the control shaft 14, it moves the control shaft 14 into an opposite limit position from the limit position when torque is applied to the electromagnetic control device.

Figure 5:
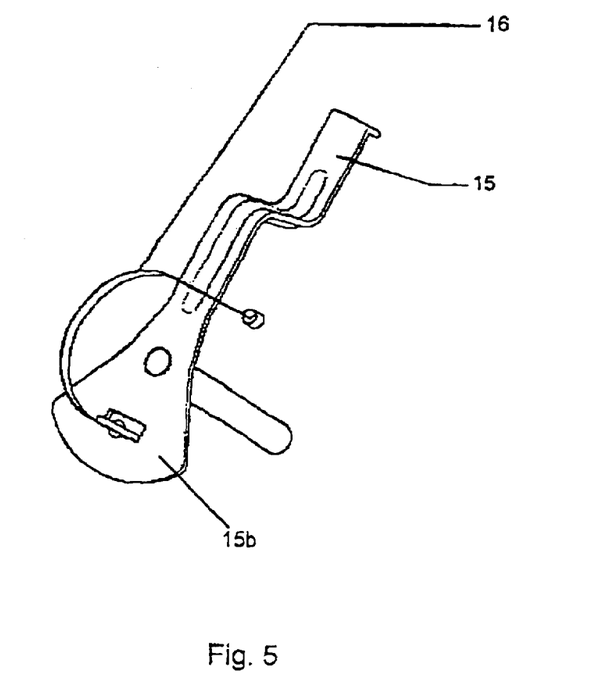
FIG. 5 is a detailed perspective view of a device for closing and opening the flow paths.

FIG. 5 shows one preferred rotary slide 15 and the restoring device 16 in detail. The rotary slide 15 is balanced by a counterweight 15b.

Figure 6A:
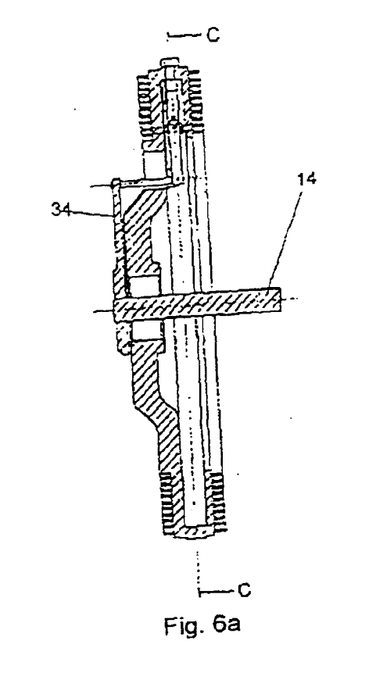
FIG. 6a is a cross-sectional view through the drive body shown in FIG. 6c.
Figure 6B:
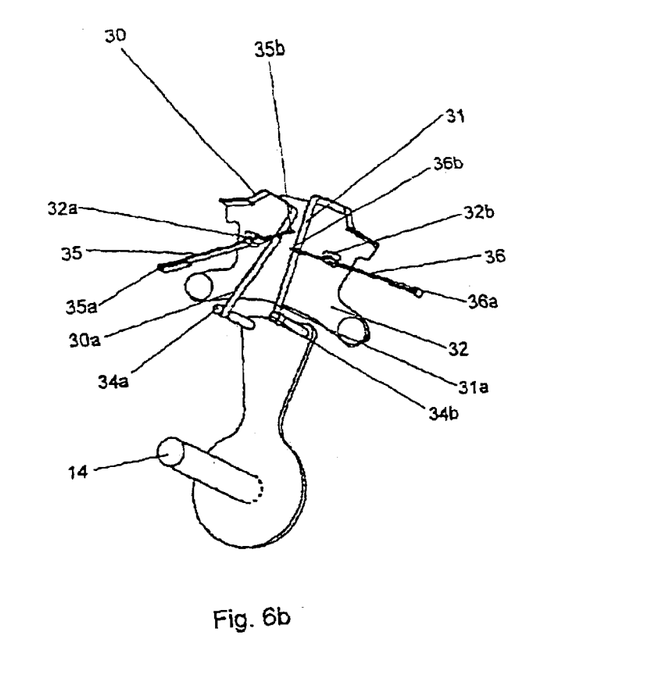
Figure 6C:
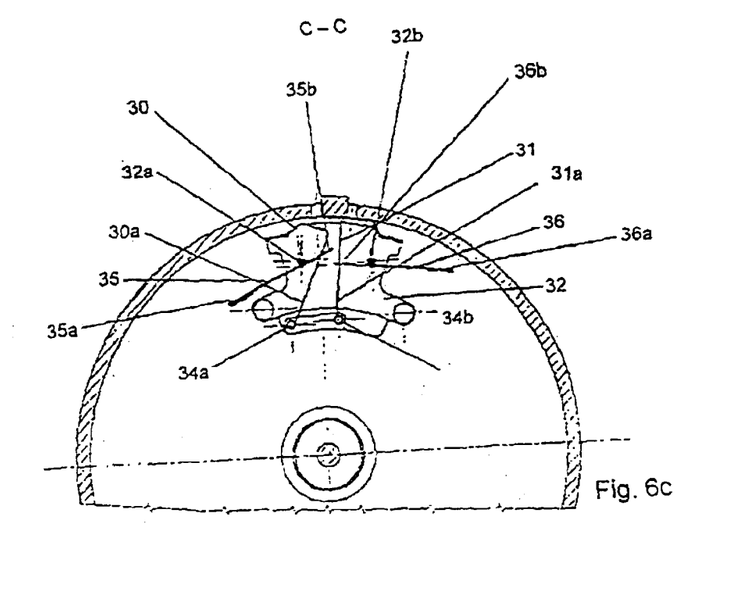

FIGS. 6a/b/c show an alternative embodiment of the device for closing and opening the flow paths (diaphragm valve arrangement), which allows through-flow in preferably one direction. The spring strips 30, 31 close and open the flow paths 11b, 11c radially from the inside. The two spring strips 30, 31 are mounted on a carrier plate 32. At their free ends 30a, 31a they are moved by a driver 34, which is connected to the control shaft 14, via driving pins 34a, 34b. Advantages of this design are the low leak rate at the flow paths 11b, 11c and the low demands imposed on the bearing accuracy of the control shaft 14. To compensate for the restoring forces, a compensation lever 35, 36, which at its free end has a counterweight 35a, 36a, is provided at each spring strip 30, 31. The counterweights 35a, 36a are dimensioned such that the lifted mass of the spring strip is precisely compensated for. In each case the other ends of the compensation levers 35b, 36b are inserted in a longitudinally moveable fashion into openings in the spring strips, in order to be carried with them. The compensating levers are mounted on corresponding fixing points 32a/b on the carrier plate 32.

Figure 7A:
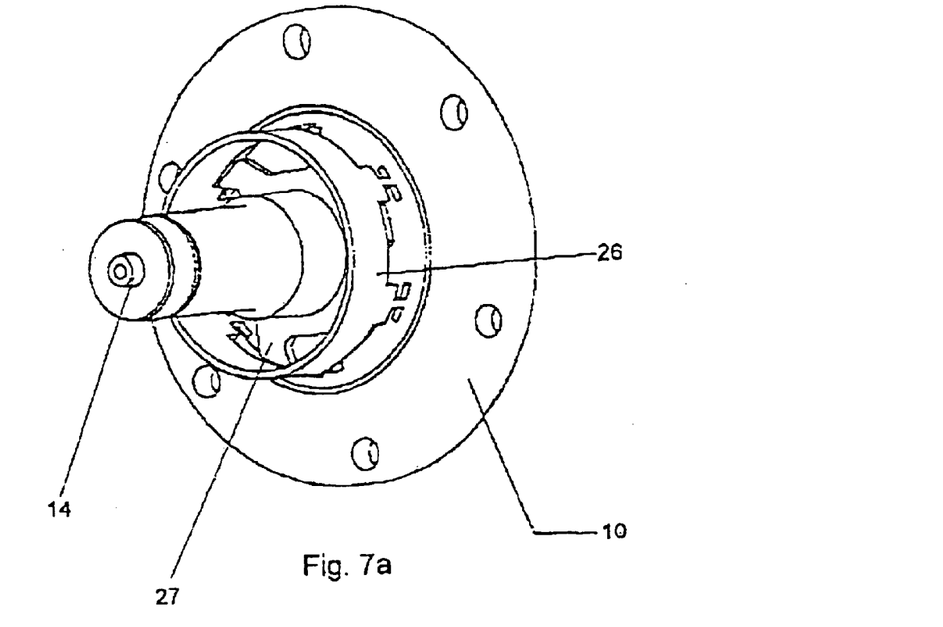
FIG. 7a is a perspective view of an electromagnetic control device for the device for closing and opening the flow paths.
Figure 7B:
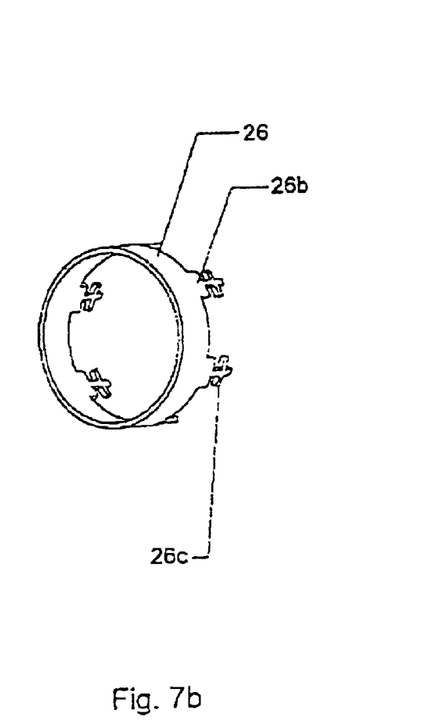
FIG. 7b is a perspective view of a magnetic flux ring of an electromagnetic control device.
Figure 7C:
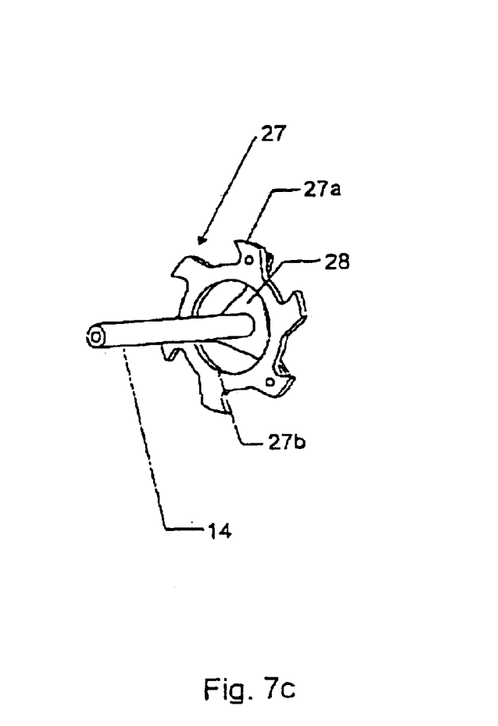
FIG. 7c is a perspective view of an armature of an electromagnetic control device.

FIGS. 7a/b/c show parts of an electromagnetic control device in which a magnetic field is induced in order to generate a torque at the control shaft. In its region 26b remote from the coil, the flux guide ring 26 is designed in pole shoe form. In a further extension 26c, it is plugged into a corresponding bore in the drive shaft (flanged shaft) 10, where it is fixed in a positively locking manner and/or by material-to-material bonding. These securing lugs in the region 26b are considerably narrowed in cross section, so that as little magnetic flux as possible is lost without being used via the securing. The magnetic flux to be used is transmitted via the pole shoes in the region 26b to the magnet armature 27, which can rotate relative to the drive shaft 10. This results in a current-dependent torque between magnet armature 27 and the pole shoes of the flux guide ring 26. The outer diameter region of the magnet armature 27a is likewise configured in the form of pole shoes. In the inner diameter region 27b, the magnet flux is passed via a gap to the flanged shaft 10. The magnetic circuit closes again with respect to the housing via a further gap 23a. The magnet armature 27 is connected to the control shaft 14 in a non-positively locking manner via a driver 28. The arms 28a of the driver 28 engage through corresponding local cutouts 10a in the flanged shaft 10, so that an adjustment movement can be transmitted into the center of the flanged shaft 10 without the mechanical strength of the latter being significantly reduced. The control shaft is mounted in the drive shaft 10 by two bearing sleeves 29a/b.

Figure 8:
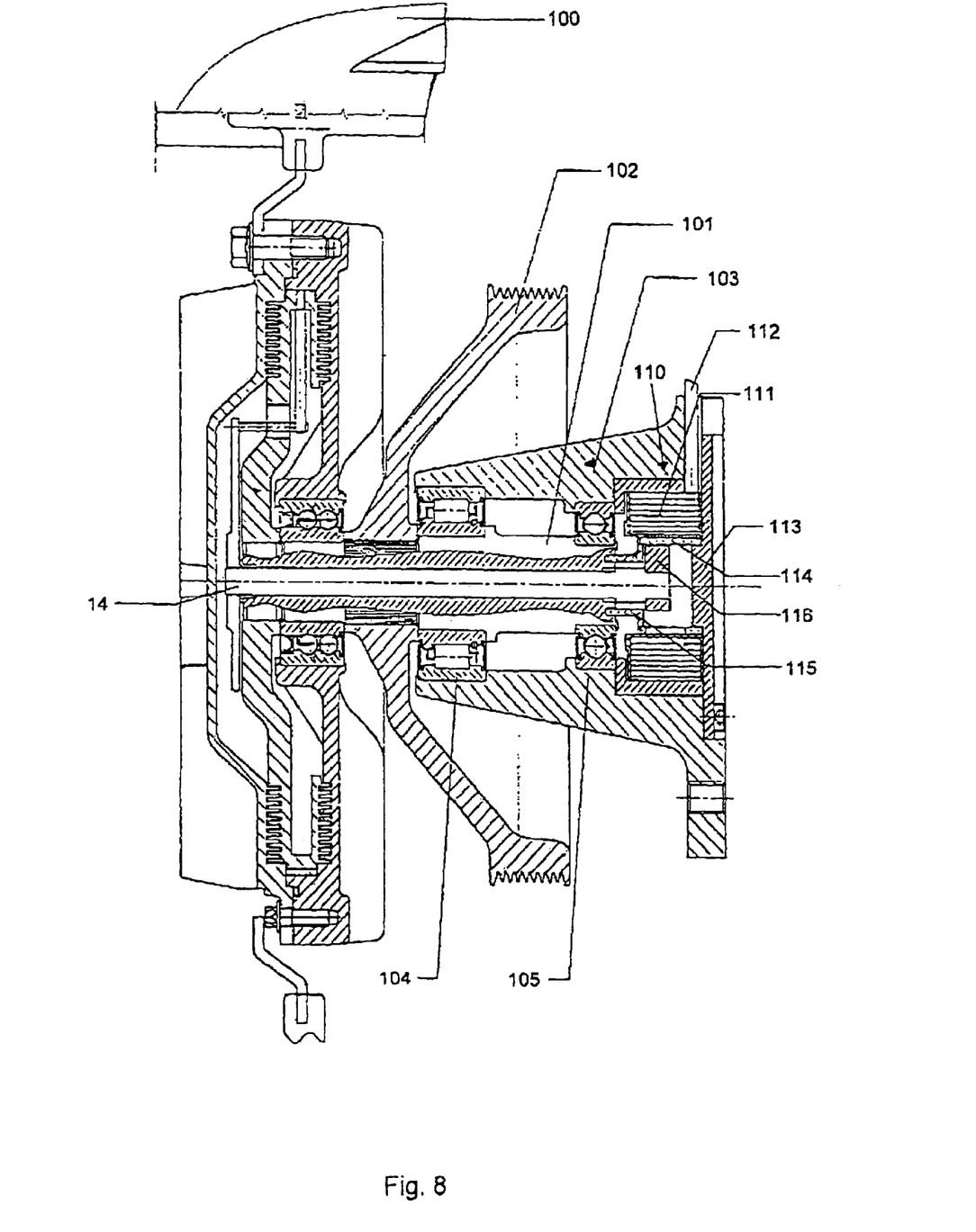
FIG. 8 is a cross-sectional view of a further preferred exemplary embodiment of the fluid friction clutch with integrated pulley mounting.

FIG. 8 shows an alternative embodiment of the fluid friction clutch with integrated belt pulley mounting. The fluid friction clutch is in this case secured with the fan on a non-rotating component of the engine.

To reduce costs and to simplify assembly, by way of example, a separate bearing unit is combined with the belt pulley to form a single unit with the fluid friction clutch (FIG. 8).

According to this exemplary embodiment, the fan 100 is secured to the cover and not to the base body. This has the advantage that, firstly, the clutch/belt pulley unit can be secured, for example, to the engine, and then the fan is mounted on the clutch.

The exemplary embodiment comprises a drive shaft 101, a belt pulley 102 and a bearing housing 103. In the bearing housing 103 there are two rolling-contact bearings 104/105 and the electromagnetically controlled torque device 110, comprising a coil module 111, which is supplied with current via an electric line 112. The bearing housing 103 is closed off by a closure cover 113.

The magnetic flux generated by the coil is transmitted via the closure cover 113 and via a gap to the pole ring 114 which rotates with the drive shaft 101. The pole ring 114 is connected to the drive shaft 101 in a non-positively locking manner, via a magnetically insulating sleeve 115. As in the first exemplary embodiment, the control shaft 14 is mounted rotatably inside the drive shaft 101. At the end of the control shaft 14, which is on the side of the magnet assembly, there is a magnet armature 116, the external diameter region of which is designed in pole shoe form, with the result that when the coil 111 is energized a directed force is formed between the magnet armature 116 and the pole ring 114. This torque moves the control shaft 14 into a limit position. A return spring (not shown here) moves the control shaft 14 back into the starting position.

Figure 9:
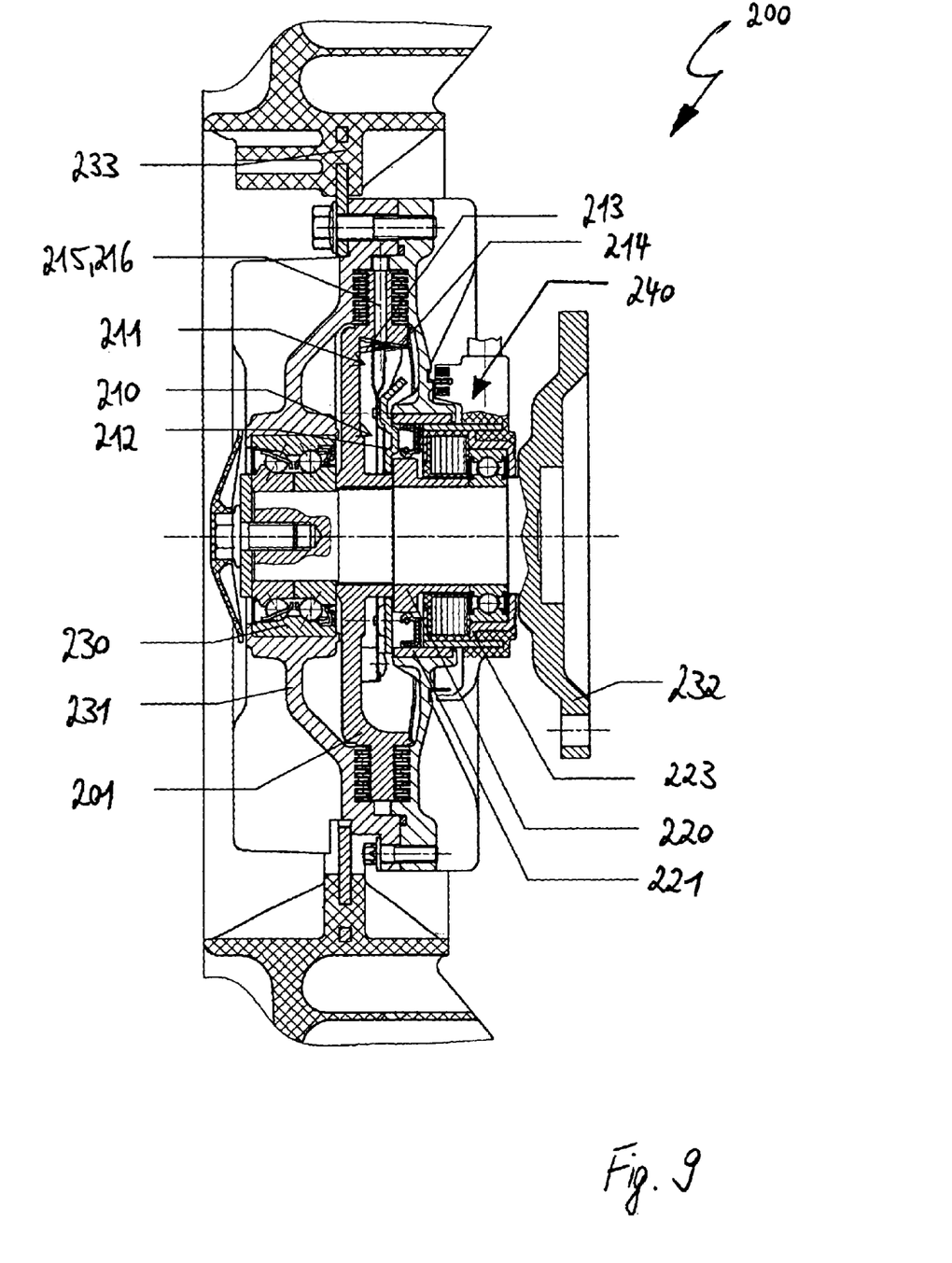
FIG. 9 is a cross-sectional view of a further preferred exemplary embodiment of the fluid friction clutch with an alternative embodiment of the device for closing and opening the flow paths.
Figure 10:
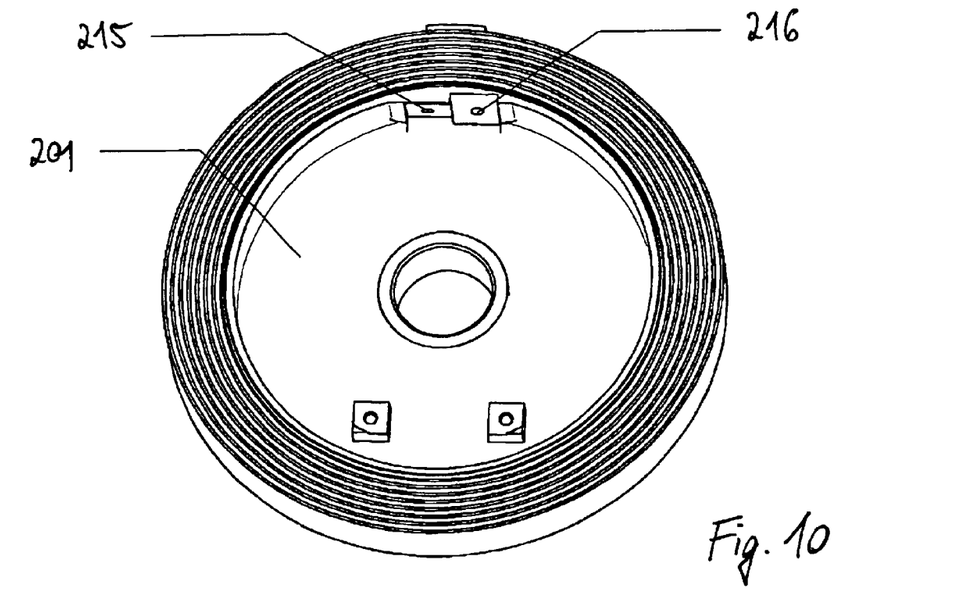
FIG. 10 is a perspective view showing a drive body of the fluid friction clutch as shown in FIG. 9.
Figure 11:
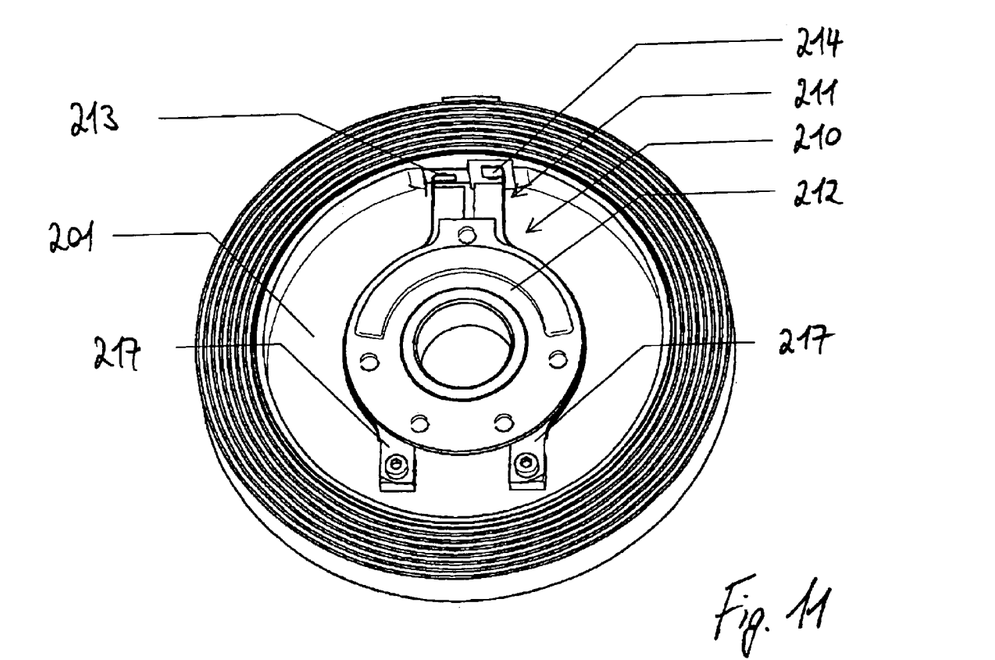
FIG. 11 is a perspective view showing a drive body and a device for closing and opening the flow paths.

FIGS. 9, 10 and 11 show a fluid friction clutch 200 whose valve arrangement for alternately closing and opening the flow paths 215, 216 in the primary disk 201 is actuated by a magnet arrangement in accordance with the hinged armature principle. The valve-closing element 211 is part of the valve lever 210 and is directly connected to the hinged armature 212, and it acts alternately on the flow paths 215, 216 by means of its two sealing surfaces 213, 214. The valve lever is elastically connected to the primary disk 201 via a leaf spring 217. The leaf spring and the valve-closing element may be produced integrally from spring steel sheet.

The plane of the sealing surfaces may, in the sense of a slide valve, be formed at right angles to the direction of movement of the closing element, in which case the pressure of the medium which is to be sealed does not act on the movement of the closing element, i.e. there are no interfering hydraulic forces acting on the magnet-spring system. The direction of movement is in this case axial with respect to the clutch. However, an arrangement of this type should be operated with sealing gaps in the range from 0.2 to 0.4 mm, in order to prevent jamming. However, this type of sealing gap leads to leakage losses which affect the functioning of the clutch at various operating points. Furthermore, particles in the sealing gap which are present in the system can still cause the closing element to jam.

In the further improved embodiment shown in FIG. 9, the sealing surfaces are inclined at an angle of approximately 80° with respect to the direction of movement to the closing element, causing the sealing gap to disappear at the end of the valve movement, which results in a higher degree of sealing. On the other hand, the sealing gap increases in size considerably with the opening distance, so that particles can no longer lead to jamming. The angle is selected in such a way that on the one hand the pressure which is to be sealed has the minimum possible effect on the valve movement, but on the other hand also no self-locking effect occurs.

By way of example, the embodiment described in FIG. 3b likewise uses sealing surfaces which are inclined at an angle of 90° with respect to the direction of movement of the valve element. The direction of movement is in this case the peripheral direction of the clutch. The variant with sealing surfaces inclined through approximately 80° can in this case likewise be employed, with the advantages which have been mentioned.

To ensure that the magnetic field generated by the non-rotating electric coil of the electromagnet control unit 240 acts effectively on the magnet armature, the magnet armature is located on that side of the primary disk which faces the coil. The steel sleeve 220 which rotates with the flanged shaft forms the inner pole of the magnet. The outer pole of the magnet is the steel sleeve 221 which has been inserted into the housing cover; this steel sleeve 221 is acted on by the magnetic flux via the steel housing elements 223 of the magnet coil, to which it is connected via a radial air gap.

This compact geometric arrangement of magnet armature with respective magnet coil is made possible by the central bearing element 230 of the clutch housing being arranged on the side which is remote from the securing flange of the clutch, i.e., on the front-side housing part 231. The fan can then be secured to the front-side housing part from the clutch front side. During vehicle final assembly, the clutch and fan can then be mounted on the engine successively and independently of one another. On the other hand, the direct flow of force from the flanged shaft 232 via the bearing element 230 and the housing part 231 to the fan 233 is still ensured.

The foregoing description of preferred embodiments of the invention has been presented for purposes of illustration and description. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto and that the claims encompass the disclosed embodiments and their equivalents.

What is claimed is:

1. A fluid friction clutch, comprising: a rotatably mounted shaft; a drive body which is mounted in a rotationally fixed manner on the shaft; an output body, mounted rotatably on the shaft and at least partially surrounding the drive body; a clutch region arranged between the drive body and output body, which accommodates a viscous fluid and can be used to couple drive body and output body in order to transmit a torque; a reservoir for at least largely holding the fluid positioned radially inside an outer periphery of the drive body; at least one first flow path for return of the fluid from the clutch reunion into the reservoir and at least one second flow path for for supplying the fluid from they reservoir into the clutch region; at least one flow resistance element located at the outer periphery of the drive body and arranged between the first flow path and the second flow path, and a controllable device for selectively closing and opening at least one of the first and second flow paths.

2. A fluid friction clutch, as claimed in claim 1, wherein the shaft comprises at least a first component connected in a non-positively locking manner to a drive unit and a second component held coaxially in the first component and being mounted rotatably with respect to this first component.

3. A fluid friction clutch as claimed in claim 2, wherein the first component comprises a drive shaft for the drive body and the second component comprises a control shaft for the device for selectively closing and opening the flow paths.

4. A fluid friction clutch as claimed in claim 1, wherein the drive body is connected in a non-positively locking manner to the shaft, and the drive body, in the clutch region, has concentric projections which are arranged on the outer surfaces of the drive body.

5. A fluid friction clutch, in particular as claim 4, wherein the output body, in the clutch region, has inner, concentric projections which engage at a predetermined distance in the projections of the drive body.

6. A fluid friction clutch, as claimed claim 1, wherein the viscous fluid includes at least one fluid selected from the group of fluids consisting of a hydraulic oil, a silicone oil, silicone, a synthetic or natural polymer compound and a hydrocarbon compound.

7. A fluid friction clutch, as claimed in claim 1, wherein the reservoir for the fluid extends substantially in a cylindrical section in the clutch region inside the outer wall of the drive body.

8. A fluid friction clutch, as claimed in claim 1, wherein the flow paths are arranged on the radially outer side in the peripheral area of the drive body and are at a predetermined distance from the flow resistance element.

9. A fluid friction clutch, as claimed claim 1, wherein at least one flow path for the return flow of the fluid from the clutch region into the reservoir is arranged in front of the flow resistance element, as seen in the direction of rotation, and at least one flow path for the incoming flow of the fluid from the reservoir into the clutch region is arranged behind the flow resistance element, as seen in the direction of rotation.

10. A fluid friction clutch, as claimed claim 5, wherein the output body, on its inner periphery has a concentric recess running all the way around in the peripheral direction.

11. A fluid friction clutch, as claimed in claim 10, wherein the outer boundary of the flow resistance element engages at a predetermined distance into the recess, which runs all the way around in the peripheral direction, of the output body.

12. A fluid friction clutch, as claimed claim 10, wherein the flow resistance element engages in a substantially liquid-tight manner in the recess which runs all the way around in the peripheral direction.

13. A fluid friction clutch, as claimed claim 10, wherein the projections on the output body and/or on the drive body have at least one substantially radially arranged groove which at least partially interrupts the projections and is in fluid communication in the clutch region.

14. A fluid friction clutch, as claimed in claim 1, wherein contact surface area in the clutch region is altered as a function of the quantity of fluid.

15. A fluid friction clutch, as claimed claim 13, wherein the groove is arranged at a predetermined distance, and at a predetermined angle, with respect to one of the flow paths.

16. A fluid friction clutch, as claimed claim 1, wherein the controllable device for selectively closing and opening the flow paths in a first position opens the second flow path for the incoming flow of the fluid into the clutch region and closes the first flow path for return flow, and in a second position closes the second flow path for incoming flow and opens the first flow path for return flow.

17. A fluid friction clutch, as claimed claim 16, wherein the controllable device for selectively closing and opening the flow paths comprises a sealing element and a counterweight, which are arranged in a non-positively locking manner on a control shaft, and further comprises a restoring device, and wherein the sealing element is positioned at a predetermined distance from the inner contour of the drive body.

18. A fluid friction clutch, as claimed in claim 1, wherein the controllable device for selectively closing and opening has two sealing elements which are connected to a control shaft via an articulated joint and radially close off the flow paths.

19. A fluid friction clutch, as claimed in claim 1, wherein, the controllable device for selectively closing and opening has two sealing elements for closing off flow paths, which are connected to the drive body via a lever, and wherein the sealing elements are positioned at a predetermined distance from the inner contour of the drive body.

20. A fluid friction clutch, as claimed in claim 1, wherein at least one of the flow paths can be closed off semi-radially by a sealing element.

21. A fluid friction clutch, as claimed in claim 3, wherein the position of the control shaft relative to the outer drive shaft is adjusted by means of an electromagnetically controlled torque device.

22. A fluid friction clutch, as claimed in claim 21, wherein the torque device comprises an armature connected in a non-positively locking manner to the control shaft, a ring connected in a non-positively locking manner to the drive shaft, and a coil arranged in a rotationally fixed manner.

23. A fluid friction clutch, as claimed in claim 1, further comprising a bearing device for bearing the output body on the shaft, and an electromagnetic control unit for controlling a controllable device for closing and opening one or more flow paths, and wherein the bearing device and the electromagnetic control unit are arranged on opposite sides of the drive body.

24. An appliance for operating a ventilating system which includes at least one fan, a drive unit, a connecting element and at least one fluid friction clutch, as claimed in claim 1.

25. A motor vehicle including a motor and a cooling fan driven by the motor, and a fluid friction clutch for connecting the motor and cooling fan, wherein the fluid friction clutch is as claimed according to claim 1.

26. A fluid friction clutch, as claimed in claim 1, wherein the at least one flow resistance element is located circumferentially between the first and second flow paths, about the outer circumference of the drive body.

\* \* \* \* \*